United States Patent
Mukai et al.

(10) Patent No.: US 8,554,413 B2
(45) Date of Patent: Oct. 8, 2013

(54) STEERING CONTROL APPARATUS

(75) Inventors: Yasuhiko Mukai, Anjo (JP); Hideki Kabune, Nagoya (JP); Kouichi Nakamura, Toyota (JP); Masashi Hori, Anjo (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 231 days.

(21) Appl. No.: 13/134,736

(22) Filed: Jun. 15, 2011

(65) Prior Publication Data

US 2011/0313620 A1 Dec. 22, 2011

(30) Foreign Application Priority Data

Jun. 22, 2010 (JP) .................. 2010-141330

(51) Int. Cl.
*A01B 69/00* (2006.01)
(52) U.S. Cl.
USPC .................................................. 701/41
(58) Field of Classification Search
USPC ............... 701/41, 42; 180/443, 444, 446
See application file for complete search history.

(56) References Cited

U.S. PATENT DOCUMENTS

| | | | |
|---|---|---|---|
| 2006/0118352 A1* | 6/2006 | Ito | 180/444 |
| 2008/0264714 A1 | 10/2008 | Morikawa | |

FOREIGN PATENT DOCUMENTS

| | | | |
|---|---|---|---|
| JP | 2000-043737 | * | 2/2000 |
| JP | U49-46430 | | 2/2000 |
| JP | 2005-162124 | | 6/2005 |
| JP | 2007-142573 | | 6/2007 |
| JP | 2007-313958 | | 12/2007 |
| JP | 2008-273327 | | 11/2008 |
| JP | 2009-083517 | | 4/2009 |
| JP | 2009-126421 | | 6/2009 |

OTHER PUBLICATIONS

Decision of Refusal issued Nov. 22, 2012 in corresponding Japanese Application No. 2010-141330 (with English translation).
Office Action dated Apr. 18, 2012 in corresponding Japanese Application No. 2010-141330 (with English translation).
Office Action mailed Apr. 23, 2013 in the corresponding JP Application No. 2010-141330 with English translation thereof.

* cited by examiner

*Primary Examiner* — Kim T Nguyen
(74) *Attorney, Agent, or Firm* — Harness, Dickey & Pierce, PLC (57) ABSTRACT

A VGRS device checks whether assist control of an EPS device for assisting steering operation of a steering wheel is being stopped. If the assist control of the EPS device is being stopped, a speed increase ratio is determined so that the rotation angle of the output shaft is less than the rotation angle of the input shaft. A VGRS motor is controlled and driven based on a determined speed increase ratio. Thus, steering operation of the steering wheel can be controlled appropriately so that the steering operation of the steering wheel can be continued with relatively small torque. It is less likely that a driver will erroneously feel that the steering wheel is locked.

2 Claims, 10 Drawing Sheets

STEERING CONTROL APPARATUS

CROSS REFERENCE TO RELATED APPLICATION

This application is based on and incorporates herein by reference Japanese patent application No. 2010-141330 filed on Jun. 22, 2010.

FIELD OF THE INVENTION

The present invention relates to a steering control apparatus, which controls steering of tire wheels of a vehicle.

BACKGROUND OF THE INVENTION

It is conventionally known that a variable gear ratio steering (VGRS) device is capable of varying a ratio of a steered angle relative to a steering angle of a steering device. According to the following patent document 1, for example, a differential wheel mechanism and a variable gear ratio device are directly coupled to a shaft of a steering wheel provided as a steering device. The variable gear device has a gear ratio control motor, which drives the differential gear mechanism. It is recently also known that an electric power steering (EPS) device is used together with the VGRS device as a mechanism for assisting steering operation of a vehicle. The electric power steering apparatus is operated electrically to generate torque.
(Patent document 1) JP 2008-273327A For example, if the steering assist operation of the EPS device stops due to, for example, its failure or the like, larger torque is required to operate a steering wheel than normally required. If the steering assist operation of the EPS device in a medium-sized or large-sized vehicle, which is heavy, it is sometimes almost impossible to operate the steering wheel. If such torque larger than the normal torque is required to operate the steering wheel, a driver will erroneously feel that the steering wheel is locked.

SUMMARY OF THE INVENTION

It is therefore an object of the present invention to provide a steering control apparatus, which appropriately controls steering of steered wheels by varying control of a variable gear ratio steering device, when steering assist operation of a power steering device for a steering wheel is stopped.

According to one aspect of the present invention, a steering control apparatus comprises an input shaft, an output shaft, a variable gear ratio steering device, a power steering device. The input shaft is coupled to a steering device operated by a driver. The output shaft is provided rotatably to the input shaft and forming a torque transfer path to transfer torque applied to the steering member to steered wheels side. The variable gear ratio steering device includes a gear mechanism, which transfers rotation of the input shaft to the output shaft, and a first motor, which drives the gear mechanism. The variable gear ratio steering device is configured to vary a ratio between a rotation angle of the input shaft and a rotation angle of the output shaft. The power steering device includes a second motor and is configured to assist steering operation of the steering device by the driver by torque generated by the second motor.

The steering control apparatus further comprises a speed increase ratio calculation part, a drive control part and a stop check part. The speed increase ratio calculation part determines a ratio between the rotation angle of the input shaft and the rotation angle of the output shaft. The drive control part controls operation of the first motor based on the speed increase ratio determined by the speed increase ratio calculation part. The stop check part checks whether steering assist operation of the power steering device is being stopped. The speed increase ratio calculation part determines the speed increase ratio so that the rotation angle of the output shaft is reduced to be less than the rotation angle of the input shaft, when the stop check part determines that the steering assist operation of the power steering device is being stopped.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EMBODIMENT

First Embodiment

A steering control apparatus according to a first embodiment of the present invention will be described with reference to FIG. 1 to FIG. 17. General structure of a steering system 100 will be described first with reference to FIG. 1.

Figure 1:
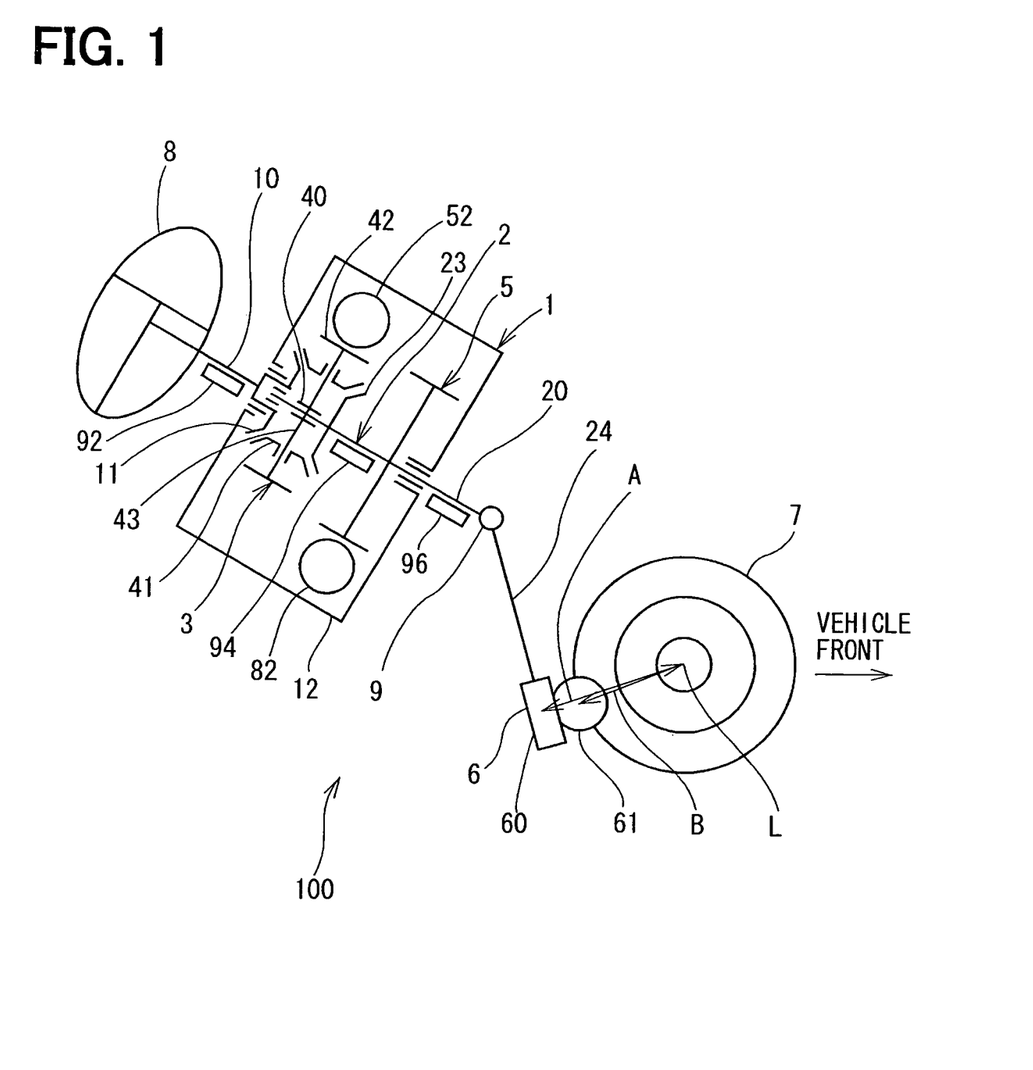
FIG. 1 is a schematic view showing a steering control system according to a first embodiment of the present invention.

As shown in FIG. 1, the steering system 100 includes a steering control apparatus 1, a column shaft 2, a rack-and-pinion mechanism 6, vehicle wheels (steered front wheels) 7, a steering wheel 8 as a steering device, and the like. The column shaft 2 and the rack-and-pinion mechanism 6 form a torque transfer path.

The steering control apparatus 1 includes a variable gear ratio steering device 3, an electric power steering device 5 and the like. The variable gear ratio steering device 3 varies a ratio between a rotation angle of an input shaft 10 and a rotation angle of an output shaft 20. The electric power steering device 5 is a power steering device, which generates assist torque for assisting steering operation of the steering wheel 8 by a driver. The variable gear ratio steering device 3 and the electric power steering device 5 are referred to as a VGRS device and an EPS device, respectively. The VGRS device 3 and the EPS device 5 are provided about the column shaft 2 and accommodated within a housing 12. The VGRS device 3 and the EPS device 5 are thus integrated into a single module.

In the power steering control apparatus 1, the column shaft 2 includes the input shaft 10, the output shaft 20. The output shaft 20 is coupled to a universal joint 9 and a shaft 24. The input shaft 10 is coupled to the steering wheel 8, which is steered by a driver. A steering wheel sensor 92 is provided on the input shaft 10 to detect a steering angle θh, which indicates an angle of steering of the steering wheel 8.

The output shaft 20 is provided coaxially with the input shaft 10 and relatively rotatable to the input shaft 10. The input shaft 10 and the output shaft 20 are rotated in opposite directions due to operation of a differential gear of the VGRS device 3. The output shaft 20 transfers steering torque, which is generated by steering operation of the steering wheel 8 by the driver, to the vehicle wheels 7 through the universal joint 9, the shaft 24 and the rack-and-pinion mechanism 6. A pinion angle sensor 96 is provided on the output shaft 20 to detect a pinion angle.

The rack-and-pinion mechanism 6 includes a steering pinion 60, a steering rack bar 61 and the like. The rack-and-pinion mechanism 6 is positioned at a rear side of a vehicle relative to a straight line (indicated by L in FIG. 1), which connects centers of rotation of the vehicle wheels 7, which are provided at a left side and a right side of the vehicle. The steering pinion 60 is a disk-shaped gear and provided at an axial end, which is opposite to the steering wheel 8. The steering pinion 60 is rotatable in both forward and reverse directions with the shaft 24. A steering rack bar 61 is provided movably in both left and right directions of the vehicle. As rack teeth provided on the steering rack bar 61 are meshed with the steering pinion 60, rotary motion of the steering pinion 60 is changed into linear motion of the steering rack bar 61 in left and right directions of the vehicle. That is, the rack-and-pinion mechanism 6 changes the rotary motion of the column shaft 2 to the linear motion.

Although not shown, tie rods and knuckle arms are provided at both ends of the steering rack bar 61 so that the steering rack bar 61 is coupled to the vehicle wheels 7 through the tie rods and the knuckle arms. Thus the vehicle wheels 7 at left and right sides are steered in correspondence to an amount of movement of the steering rack bar 61.

A distance between the steering pinion 60 and the straight line L connecting the centers of rotation of the vehicle wheels 7 is longer than a distance B between the steering rack bar 61 and the line L connecting the centers of rotation of the vehicle wheels 7. The output shaft 20 rotates in a direction opposite to that of the input shaft 10 because of operation of the differential gear provided between the input shaft 10 and the output shaft 20. For this reason, when the steering wheel 8 is steered in the counter-clockwise direction (left direction), the steering pinion 60 rotates in the clockwise direction when viewed from the side of the universal joint 9. The steering rack bar 61 moves in the right direction and the steered angle of the vehicle wheels 7 is varied so that the vehicle turns in the left direction. When the steering wheel 8 is steered in the clockwise direction (right direction), the steering pinion 60 rotates in the counter-clockwise direction when viewed from the side of the universal joint 9. The steering rack bar 61 moves in the left direction and the steered angle of the vehicle wheels 7 is varied so that the vehicle turns in the right direction.

By thus setting the distance A between the steering pinion 60 and the straight line L connecting the centers of rotation of the vehicle wheels 7 to be longer than the distance B between the steering rack bar 61 and the straight line L connecting the centers of rotation of the vehicle wheels 7, that is, A>B, the vehicle wheels 7 are steered in the direction opposite to the direction of rotation of the output shaft 20, the shaft 24 and the steering pinion 60. The direction of rotation of the steering wheel 8 and the direction of steered angle of the vehicle wheels 7 are matched.

As described above and shown in FIG. 2 and FIG. 3, the steering control apparatus 1 includes the housing 12, the input shaft 10, the output shaft 20, the VGRS device 3, the EPS device 5. The housing 12 is formed of a housing body 121 and an end frame 122. The housing body 121 and the end frame 122 are fixed to each other by screws 123. A gear mechanism 30 is accommodated within the housing 12. The input shaft 10 and the output shaft 20 are passed through the housing 12. A first bearing device 13 is provided in the housing body 121 at a side, which is opposite to the end frame 122. A second bearing device 14 is provided in the end frame 122.

Figure 2:
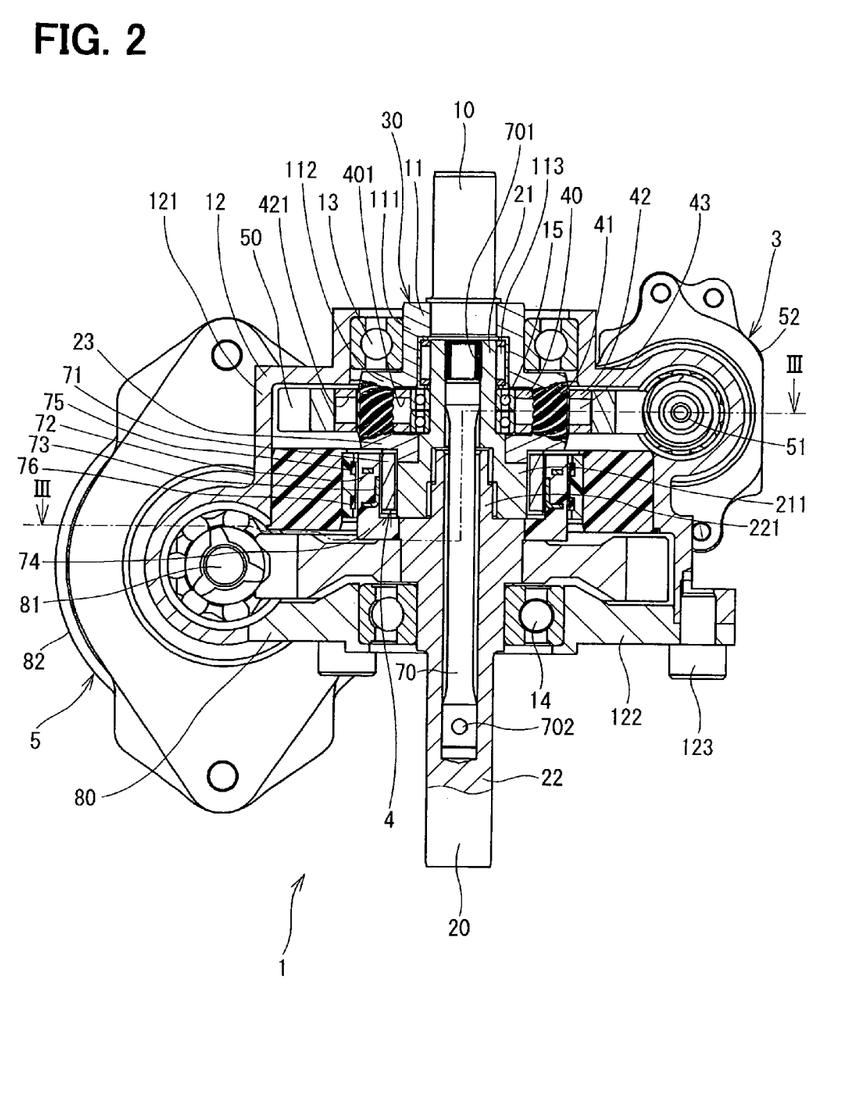
FIG. 2 is a sectional view of the steering control apparatus according to the first embodiment of the present invention.

The output shaft 20 is formed of a first output shaft 21 and a second output shaft 22. The first output shaft 21 and the second output shaft 22 are formed in a hollow pipe shape. A torsion bar 70 is passed through the inside of the hollow pipe. The first output shaft 21 is provided closer to the input shaft 10 than the second output shaft 22 is. The first output shaft 21 has an enlarged part 211 having a large inner diameter at a side opposite to the input shaft 10. The second output shaft 22 has a reduced part 221 at a side of the first output shaft 21. The reduced part 221 is smaller in outer diameter than an inner diameter of the enlarged part 211. The reduced part 221 of the second output shaft 22 is inserted into the enlarged part 211 of the first output shaft 21.

The torsion bar 70 is passed through a space formed in a radially inside part of the first output shaft 21 and the second output shaft 22. Serration 701 is formed on the torsion bar 70 at an axial end of the torsion bar 70 at a side of the input shaft 10. The serration 701 is tightly fit with serration formed on a radially inside face of the first output shaft 21. The end of the torsion bar 70, which is opposite to the input shaft 10, is coupled to the output shaft 22 by a pin 702. Thus, the first output shaft 21 and the second output shaft 22 are thus coupled to be relatively rotatable by the torsion bar 70. When torsion torque is applied to the torsion bar 70 because of relative rotation between the first output shaft 21 and the second output shaft 22, twist of predetermined resiliency generated about the shaft is generated. As a result, the torque applied between the first output shaft 21 and the second output shaft 22. Twist displacement of the torsion bar 70 is detected by a steering torque detection device 4.

The steering torque detection device 4 detects steering torque by detecting twist displacement. The steering torque detection device 4 includes multiple-pole magnets 71, a set of steering torque magnetic yoke 72, 73, a set of magnetic flux collecting rings 75, 76 and a torque sensor 94 shown in FIG. 6, etc. The steering torque detection device 4 is provided with a slight gap in the axial direction relative to an output gear 23, which will be described later.

The multiple-pole magnets 71 are formed in an annular ring shape and press-fitted with the first output shaft 21. Thus, the multiple-pole magnets 71 rotate with the first output shaft 21. The multiple-pole magnets 71 are positioned at a side more opposite to the input shaft 10 in the axial direction than an output gear 23 press-fitted with the first output shaft 21. The multiple-pole magnets 71 are magnetized with N-pole and S-pole alternately in the circumferential direction.

The set of magnetic yokes 72 and 73 are provided radially outside of the multiple-pole magnets 71 and in magnetic field formed by the multiple-pole magnets 71. The magnetic yokes 72 and 73 have nails, which extend in the axial direction from a set of annular ring parts facing in the axial direction, respectively. The nails of the yokes 72 and 73 are interleaved alternately by shifting in the circumferential direction. The magnetic yokes 72 and 73 are molded integrally with a resin mold 74. The resin mold 74 is press-fitted on the radially outside part of the second output shaft 22 through a collar, which is not shown. Thus, the magnetic yokes 72 and 73 rotate with the second output shaft 22.

The set of magnetic flux collecting rings 75 and 76 are formed in an annular shape and provided radially outside the resin mold 74, which molds the magnetic yokes 72 and 73, in a manner to be relatively rotatable against the resin mold 74. One magnetic flux collecting ring 75 is positioned to correspond to one yoke 72 in the axial direction. The other magnetic flux collecting ring 76 is positioned to correspond to the other magnetic yoke 73 in the axial direction. Although not shown, an air gap is provided between the magnetic flux collecting ring 75 and the magnetic flux collecting ring 76. The torque sensor 94 is positioned in the air gap to detect magnetic flux density in the air gap.

A method of detecting steering torque by the torque sensor 94 will be described next. When no steering torque is applied to the output shaft 20, no twist displacement is generated in the torsion bar 70. In this instance, a center of each nail of the magnetic yokes 72 and 73 and a boundary line between the N-pole and the S-pole of the magnet 71 are in alignment. The same number of magnetic lines come in the nails of the magnetic yokes 72 and 73 from the N-pole of the magnet 71 and go out from the magnetic yokes 72 and 73 to the S-pole of the magnet 71. The magnetic lines inside the magnetic yoke 72 are closed, and the magnetic lines inside the magnetic yoke 73 are closed. No magnetic flux thus leaks in the air gap formed between the magnetic flux collecting rings 75 and 76. As a result, the magnetic density detected by the torque sensor 94 is zero.

When steering torque is applied to the output shaft 20 on the other hand, twist displacement is generated in the torsion bar 70. In this instance, the relative position between the multiple-pole magnets 71 and the magnetic yoke 72 and 73 is changed in the circumferential direction. The center of each nail of the magnetic yokes 72 and 73 and the boundary line between the N-pole and the S-pole of the magnet 71 are not in alignment any more. Magnetic lines having polarities of the N-pole and the S-pole increase in the magnetic yokes 72 and 73, respectively. Magnetic flux thus leaks in the air gap formed between the magnetic flux collecting rings 75 and 76. As a result, the magnetic density detected by the torque sensor 94 is not zero any more. The magnetic density detected by the torque sensor 94 is generally proportional to the twist displacement amount of the torsion bar 70, and polarity of the detected magnetic density reverses in correspondence to the direction of twisting. Thus, the twist displacement of the torsion bar 70 is detected. As described above, the torque generated between the first output shaft 21 and the second output shaft 22 is converted into twist displacement of the torsion bar 70. The steering torque detection device 4 thus detects torque generated between the first output shaft 21 and the second output shaft 22 by detecting magnetic density generated in the air gap.

The VGRS device 3 includes the gear mechanism 30 and a VGRS motor 52, which is provided as a first motor for driving the gear mechanism 30. The gear mechanism 30 is formed of an input gear 11, an output gear 23, a pinion gear 41, a worm wheel 50 and a worm 51. The input gear 11, the output gear 23 and the pinion gear 42 correspond to a differential gear. The worm wheel 50 and the worm 51 correspond to a worm gear.

The input gear 11 is positioned at a side opposite to the steering wheel 8 of the input shaft 10. The input gear 11 is a bevel wheel, which is made of metal or resin and meshes the pinion gear 41. The input gear 11 includes a cylindrical tube part 111 and a gear part 112, which is formed in a bevel shape and positioned radially outside the tubular part 111. The input shaft 10 is press-inserted into the tubular part 111. The tubular part 111 is supported rotatably relative to the housing body 121 by the first bearing part 13 provided in the housing body 121. The input shaft 10 and the input gear 11 are thus supported rotatably in the housing 12. An axial end part of the first output shaft 21, which is at the side of the input shaft 10, is inserted in the radially inside part of the input gear 11. A needle bearing 113 is provided between the input gear 11 and the first output shaft 21. The first output shaft 21 is thus supported rotatably by the input gear 11.

The output gear 23 is provided to face the gear part 112 of the input gear 11 sandwiching the pinion gear 41. The output gear 23 is a bevel gear, which is made of metal or resin and meshes the pinion gear 41. The first output shaft 21 of the output shaft 20 is press-fitted into the output gear 23. The output gear 23 is provided at a position, which is more opposite to the input shaft 10 in the axial direction than the needle bearing 113 is.

A plurality of pinion gears 41 is provided between the input gear 11 and the output gear 23. The pinion gear 41 is a bevel wheel, which mesh the input gear 11 and the output gear 23. Here, relation among the input gear 11, the output gear 23 and the pinion gear 41 will be described. The number of teeth of the pinion gear 41 is even. The numbers of teeth of the input gear 11 and the output gear 23 are the same and odd. As a result, the point of contact between the teeth of the input gear 11 and the pinion gear 41 varies in correspondence to rotation. Similarly, the point of contact between the teeth of the output gear 23 and the pinion gear 41 varies in correspondence to rotation. For this reason, it is less likely that wear of a specified tooth progresses and local wear shortens durability. The input gear 11, the output gear 23 and the pinion gear 41 have spiral teeth so that rate of meshing between the input gear 11 and the pinion gear 41 and the rate of meshing between the output gear 23 and the pinion gear 41 are increased. In case that the input gear 11 and the output gear 23 are made of metal, the pinion gear 41 is made of resin. In case that the input gear 11 and the output gear 23 are made of resin, the pinion gear 41 is made of metal.

The pinion gear 41 is positioned radially outside of the first output shaft 21 so that its rotation axis perpendicularly crosses the rotation axis of the input shaft 10 and the output shaft 20. The pinion gear 41 is formed an axial hole, through which a pinion gear shaft member 43 is passed. The axial hole formed in the pinion gear 41 is formed to have a diameter, which is slightly larger than an outer diameter of the pinion gear shaft member 43.

A third bearing and an inner ring member 40 are provided between the pinion gear 41 and the first output shaft 21. The third bearing 15 is positioned between the needle bearing 113 and the output gear 23 in the axial direction and between the first output shaft 21 and the inner ring member 40 in the radial direction. The third bearing 15 thus rotatably supports the inner ring member 40 at a position radially outside the first output shaft 21.

The inner ring member 40 is formed first holes 401, which pass in a direction perpendicular to the rotation axis of the first output shaft 21. The first holes 401 are formed equi-angularly in the circumferential direction of the inner ring member 40. One axial end of the pinion gear shaft member 43, which is passed through the pinion gear 41, is press-fitted in the first hole 401.

An outer ring member 42 is provided radiallly outside the inner ring member 40 sandwiching the pinion gear 41. The outer ring member 42 is formed second holes 402, which pass in a direction perpendicular to the rotation axis of the first output shaft 21. The second holes 421 are formed equi-angularly in the circumferential direction of the outer ring member 42. The second holes 421 are formed at positions, which correspond to the first holes 401 of the inner ring member 40. The other axial end of the pinion gear shaft member 43, which is passed through the pinion gear 41, is press-fitted in the second hole 421. The other axial end of the pinion gear shaft member 43 is opposite to the axial end of the same fitted in the first hole 401. That is, the pinion gear 41 is positioned between the inner ring member 40 and the outer ring member 42 to be rotatable about an axis of the pinion gear shaft member 43, which is supported by the inner ring member 40 and the outer ring member 42.

The worm wheel 50 is press-fitted on the radially outside part of the outer ring member 42. That is, the first output shaft 21, the third bearing 15, the inner ring member 40, the pinion gear 41, the outer ring member 42 and the worm wheel 50 are arranged in this order from the radially inside part. The inner ring member 40, the outer ring member 42, the pinion gear shaft member 43 and the worm wheel 50 rotate together as a single body. The third bearing 15 rotatably supports the inner ring member 40, the outer ring member 42, the pinion gear shaft member 43 and the worm wheel 50 at a position radially outside the first output shaft 21.

Figure 3:
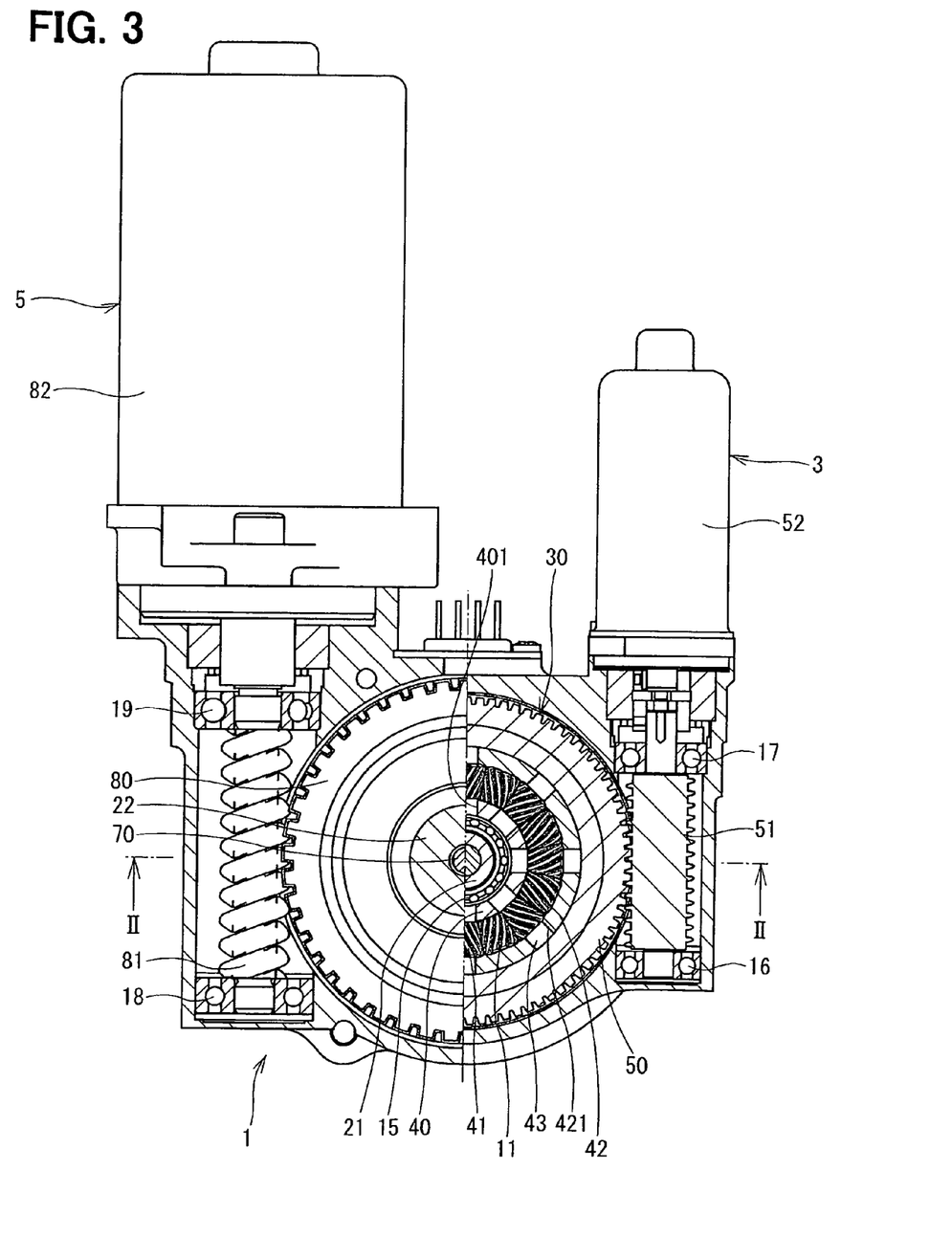
FIG. 3 is a sectional view of the steering control apparatus taken along line III-III in FIG. 2.

As shown in FIG. 3, the worm 51 meshes the radially outside part of the worm wheel 50. The worm 51 is supported rotatably by a fourth bearing 16 and a fifth bearing 17 provided in the housing 12. Lead angles of the worm wheel 50 and the worm 51 are so set that an advance angle is smaller than a friction angle. Thus, the worm wheel 50 and the worm 51 are capable of self-locking. That is, the lead angles of the worm wheel 50 and the worm 51 are set to allow self-locking.

The VGRS motor 52 is provided at a side of the fifth bearing 17 of the worm 51. The VGRS motor 52 is a brush motor. The VGRS motor 52 drives the worm 51 in forward and reverse directions in correspondence to energization (current supply). When the VGRS motor 52 drives the worm 51 in the forward direction and the worm wheel 50 correspondingly rotates in the same direction as the rotation direction of the input shaft 10, the rotation of the input shaft 10 is transferred to the output shaft 20 after being reduced in speed. When the VGRS motor 52 drives the worm 51 in the reverse direction and the worm wheel 50 correspondingly rotates in a direction opposite to the rotation direction of the input shaft 10, the rotation of the input shaft 10 is transferred to the output shaft 20 after being increased in speed. Thus, the rotation angle of the input shaft 10 and the rotation angle of the output shaft 20 are varied.

The EPS device 5 is provided at a position opposite to the VGRS motor 52 sandwiching the input shaft 10 and the output shaft 20. The EPS device 5 includes an EPS worm wheel 80, an EPS worm 81 and an EPS motor 82, which is provided as a second motor. The wheel 80 and the EPS worm 81 are accommodated within the housing 12.

The worm wheel 80 is made of resin or metal. The wheel 80 is press-fitted on the second output shaft 22 and rotates together with the second output shaft 22. The EPS worm 81 meshes the radially outside part of the wheel 80. The EPS worm 81 is supported rotatably by a sixth bearing 18 and a seventh bearing 19, which are provided in the housing 12. Teeth of the wheel 80 are so formed that each tooth line is parallel with the rotation shaft. A tooth bottom of the wheel 80 formed to be planer and not arcuate. Thus, even if the position of placing the wheel 80 deviates in the axial direction of the second output shaft 22 due to manufacturing error, contact between the wheel 80 and the EPS worm 81 can be maintained similarly in both cases of forward rotation and reverse rotation.

An EPS motor 82 is provided at a side of a seventh bearing 19 of the EPS worm 81. The EPS motor 82 is a brushless three-phase motor. The EPS motor 82 drives the EPS worm 81 to rotate in forward and reverse directions depending on eneargization. When the wheel 80 meshed with the EPS worm 81 applies steering assist torque to the second output shaft 22, steering operation is assisted.

Figure 4:
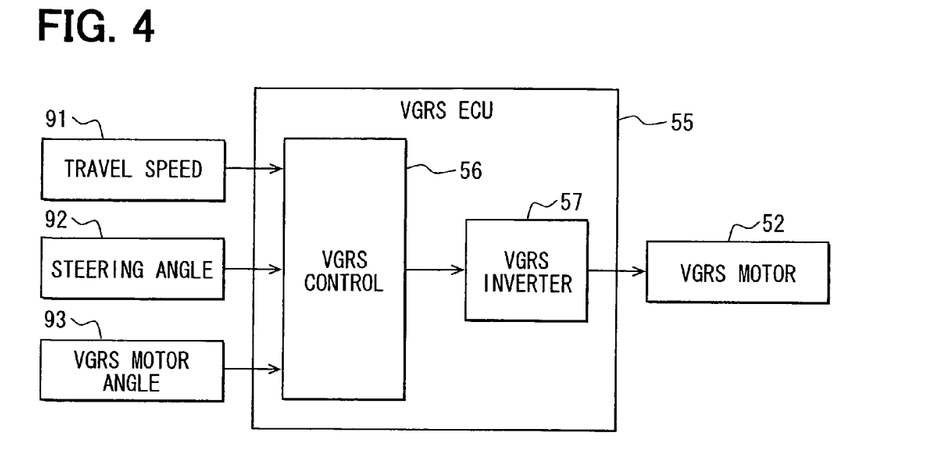
FIG. 4 is a block diagram showing a VGRS-ECU according to the first embodiment of the present invention.

A VGRS electronic control unit (VGRS-ECU) for controlling drive of the VGRS motor 52 and an EPS electronic control unit (EPS-ECU) for controlling drive of the EPS motor 82 will be described with reference to FIG. 4 and FIG. 5. FIG. 4 is a block diagram showing the VGRS-ECU 55, and FIG. 5 is a block diagram showing the EPS-ECU 85.

As shown in FIG. 4, the VGRS-ECU 55 includes a VGRS control part 56 and a VGRS inverter 57. The VGRS control part 56 is formed as an electronic computer circuit, which includes a CPU, a ROM, a RAM, an I/O and a bus line connecting these components, and performs drive control for the VGRS motor. The control part 56 is connected to a vehicle travel speed sensor 91 for detecting a vehicle travel speed of a vehicle, a steering angle sensor 92 for detecting a rotation angle of the steering wheel 8, a VGRS motor rotation angle sensor 93 for detecting a rotation angle of the VGRS motor 52, and the like.

The VGRS inverter 57 is formed of a plurality of switching elements and switches over energization of the VGRS motor 52. The switching elements forming the VGRS inverter 57 are turned on and off by the VGRS control part 56 based on the vehicle travel speed, the steering angle, the VGRS motor rotation angle. That is, the VGRS control part 56 controls operation of the VGRS motor 52 by controlling the VGRS inverter 57 based on the vehicle travel speed, the steering wheel angle, the VGRS motor rotation angle.

Figure 5:
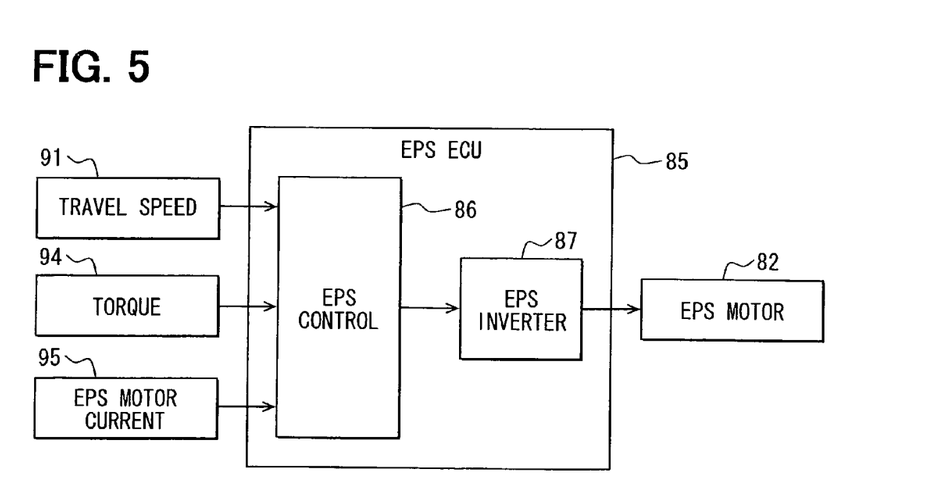
FIG. 5 is a block diagram showing an VGRS-ECU according to the first embodiment of the present invention.

As shown in FIG. 5, the EPS-ECU 85 includes an EPS control part 86 and an EPS inverter 87. The EPS control part 86 is formed as an electronic computer circuit, which includes a CPU, a ROM, a RAM, an I/O and a bus line connecting these components, and performs drive control for the EPS motor 82. The VGRS control part 56 is connected to the vehicle travel speed sensor 91, the torque sensor 94 for detecting steering torque of the steering wheel 8, an EPS motor current sensor 95 for detecting motor current supplied to the EPS motor 82.

The EPS inverter 87 is formed of a plurality of switching elements and switches over energization of the EPS motor 82. The switching elements forming the EPS inverter 87 are turned on and off by the EPS control part 86 based on the vehicle travel speed, the steering torque, the motor current and the like. That is, the EPS control part 86 controls operation of the EPS motor 82 by controlling the EPS inverter 87 based on the vehicle travel speed, the steering torque, the motor current.

Figure 6:
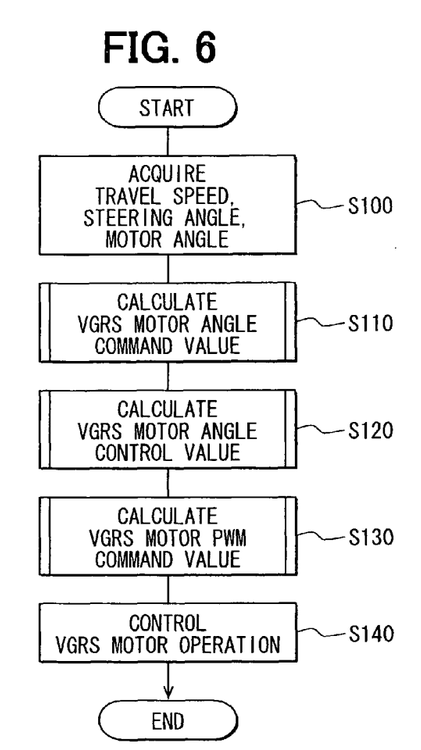
FIG. 6 is a flowchart showing control calculation processing of a VGRS device in the first embodiment of the present invention.

Control processing for the VGRS device 3 by the VGRS control part 56 will be described next with reference to FIG. 6 to FIG. 9. A main part of the control processing of the EPS part 56 for the VGRS device 3 is shown in FIG. 6.

First at S100 (S indicates a step), a vehicle travel speed sensor value outputted by the vehicle travel speed sensor 91 is retrieved and the vehicle travel speed of the vehicle is acquired. Further, a steering wheel angle sensor value outputted by the steering wheel angle sensor 92 is retrieved and the steering angle of the steering wheel 8 is acquired. In addition, a VGRS motor rotation angle sensor value outputted by the VGRS motor rotation angle sensor 93 is retrieved and the VGRS motor rotation angle is acquired. At S110, VGRS motor rotation angle command value calculation processing is performed. At S120, VGRS motor rotation angle control calculation processing is performed. At S130, VGRS motor PWM command value calculation processing is performed. At S140, the operation of the VGRS motor 52 is controlled by switching over on/off of the switching elements forming the VGRS inverter 57 based on the PWM command value calculated at S130.

The VGRS motor rotation angle command value calculation processing will be described with reference to FIG. 7. At S111, the vehicle travel speed sensor value outputted by the vehicle travel speed sensor 91 is retrieved to acquire the vehicle travel speed of the vehicle. Further, the steering angle sensor value outputted by the steering wheel angle sensor 92 is retrieved to acquire the steering angle θh of the steering wheel 8. It is assumed that the steering angle is positive and negative, when the steering wheel 8 is operated in the clockwise direction and the counter-clockwise direction, respectively.

At S112, a speed increase ratio is calculated based on the travel speed acquired at S111. Speed increase ratio calculation processing will be described later with reference to FIG. 15. At S113, a VGRS motor rotation angle command value θc is calculated thus ending the processing. The VGRS motor rotation angle θc is calculated by the following equation (1), assuming that θh is the steering angle acquired at S111, z is the speed increase ratio calculated at S112 and i is a reduction ratio of the worm gear.

$$\theta c = \theta h \times (z-1) \times i \times 0.5 \qquad (1)$$

The VGRS motor rotation angle control calculation processing will be described next with reference to FIG. 8. At S121, the VGRS motor rotation angle command value θc calculated at S113 in FIG. 7 is retrieved. Further, a VGRS motor rotation angle sensor value outputted by the VGRS motor rotation angle sensor 93 is retrieved to acquire the VGRS motor rotation angle θm. At S122, an angle difference value θd is calculated. The angle difference value θd is calculated by the following equation (2).

$$\theta d = \theta c - \theta m \qquad (2)$$

At S123, a VGRS motor voltage command value Vvc is calculated, thereby ending this processing. The VGRS motor voltage command value Vvc is feedback-controlled by using PI control. Assuming that a proportional gain and an integral gain in the VGRS motor feedback-control are KPv and KIv, respectively, the VGRS motor voltage command value Vvc is calculated by the following equation (3).

$$Vvc = KPv \times \theta d + KIv \times \int \theta d\, dt \qquad (3)$$

Figure 8:
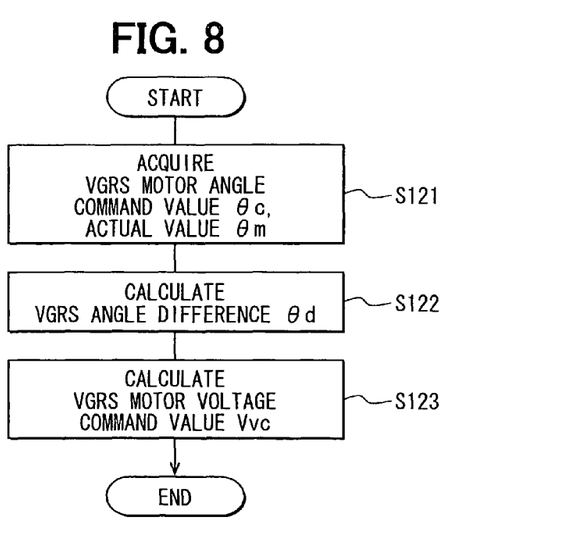
FIG. 8 is a flowchart showing VGRS motor rotation angle control calculation processing in the first embodiment of the present invention.
Figure 9:
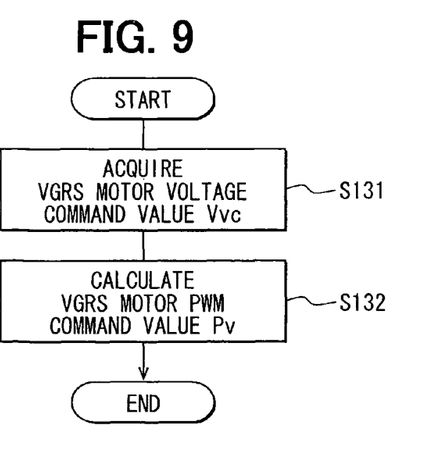
FIG. 9 is a flowchart showing PWM command value calculation processing executed by the VGRS device in the first embodiment of the present invention.

The VGRS motor PWM command value calculation processing will be described with reference to FIG. 9. At S131, the VGRS motor voltage command value Vvc calculated at S123 in FIG. 8 is acquired. At S132, a VGRS motor PWM command value Pv is calculated. Assuming that a battery voltage is Vb, the VGRS motor PWM command value is calculated by the following equation (4).

$$Pv = Vvc/Vb \times 100 \qquad (4)$$

The VGRS control part 56 controls the operation of the VGRS motor 52 by controlling timing of on/off of the switching elements of the VGRS inverter 57 (S140 in FIG. 6) based on the VGRS motor PWM command value Pv calculated at S132. The ratio between the rotation angle of the input shaft 10 and the rotation angle of the output shaft 20 is varied by driving the VGRS motor 52.

Figure 10:
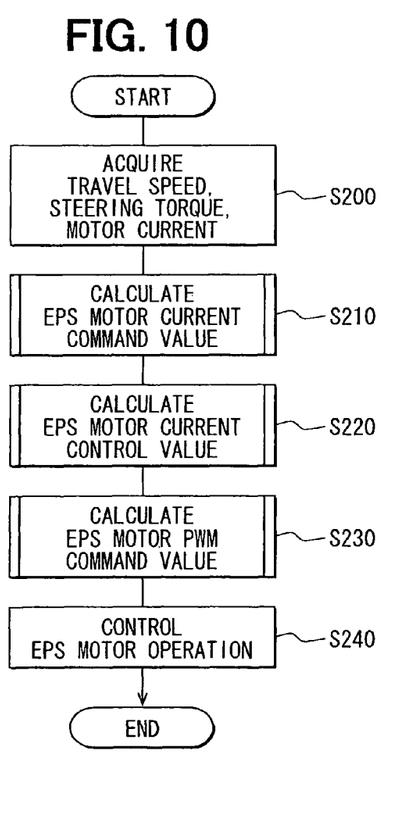
FIG. 10 is a flowchart showing control calculation processing of an EPS device in the first embodiment of the present invention.

Control processing for the EPS part 5 by the EPS control part 86 will be described next with reference to FIG. 10 to FIG. 13. A main part of the control processing of the part 86 for the EPS device 5 is shown in FIG. 10. First at S200, the vehicle travel speed sensor value outputted by the vehicle travel speed sensor 91 is retrieved and the vehicle travel speed of the vehicle is acquired. Further, the torque sensor value outputted by the torque sensor 94 is retrieved and the steering torque generated when the steering wheel 8 is operated by a driver is acquired. In addition, the current sensor value outputted by the EPS motor current sensor 95 is retrieved and the motor current supplied to the EPS motor 82 is acquired.

At S210, EPS motor current command value calculation processing is performed. At S220, EPS motor current control calculation processing is performed. At S230, a PWM command value calculation processing is performed. At S240, the operation of the EPS motor 82 is controlled by switching over on/off of the switching elements forming the EPS inverter 87 based on the PWM command value calculated at S230.

Figure 11:
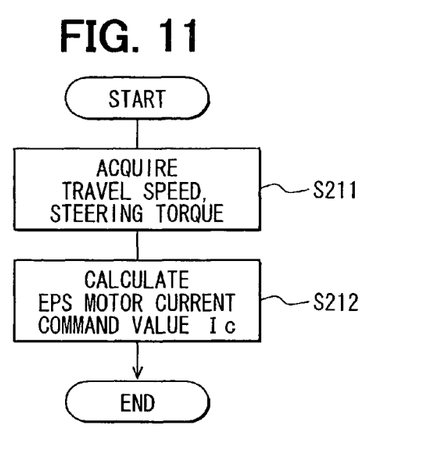
FIG. 11 is a flowchart showing EPS motor current command value calculation processing in the first embodiment of the present invention.

The EPS motor current command value calculation processing will be described with reference to FIG. 11. At S211, the vehicle travel speed sensor value outputted by the vehicle travel speed sensor 91 is retrieved to acquire the vehicle travel speed of the vehicle. Further, the torque sensor value outputted by the torque sensor 94 is retrieved to acquire the steering torque generated when the steering wheel 8 is operated by the driver.

Figure 14:
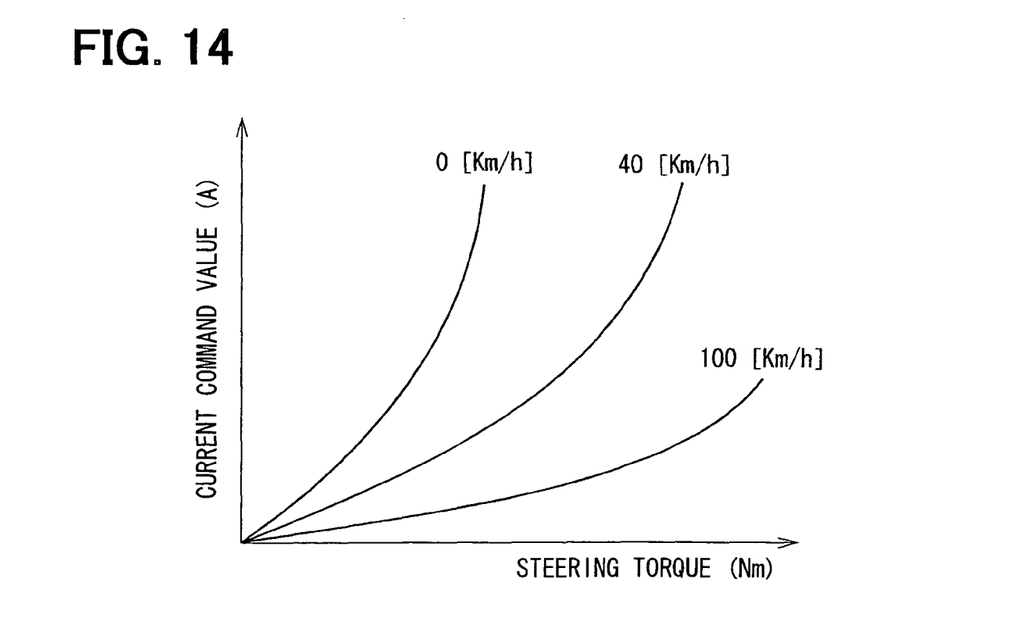
FIG. 14 is a graph showing a relation among a steering torque, a vehicle travel speed and an EPS current command value in the first embodiment of the present invention.

At S212, the EPS motor rotation current command value Ic is calculated based on the vehicle travel speed and the steering torque acquired at S211, thereby ending this processing. The relation between the steering torque and the EPS motor current command value Ic at each travel speed is pre-stored in a memory as a data map. The relation between the steering torque and the EPS motor current command value Ic is pre-stored for each travel speed as a data map shown in FIG. 14. As shown in FIG. 14, the EPS motor current command value Ic increases as the steering torque increases. The EPS motor current command value Ic decreases as the vehicle travel speed increases under a condition that the steering torque is the same.

Figure 12:
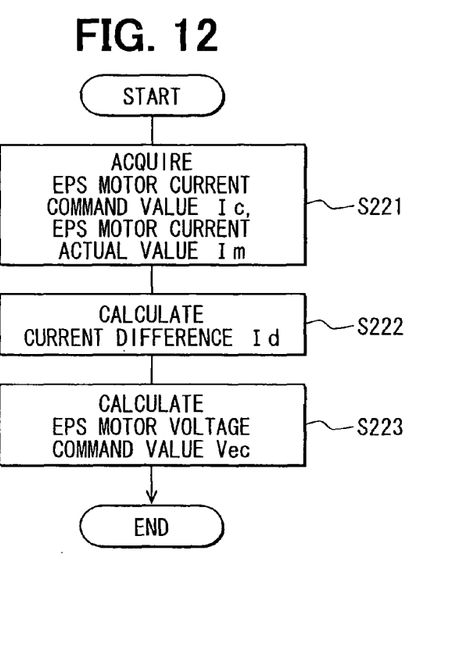
FIG. 12 is a flowchart showing EPS motor current control calculation processing in the first embodiment of the present invention.

The EPS motor current command control calculation processing will be described next with reference to FIG. 12. At S221, the EPS motor current command value Ic calculated at S212 in FIG. 11 is retrieved. Further, the current sensor value outputted by the EPS motor current sensor 95 is retrieved to acquire the motor current Im supplied to the EPS motor 82. At S222, a current difference value Id is calculated. The current difference value Id is calculated by the following equation (5).

$$Id = Ic - Im \quad (5)$$

At S223, an EPS motor voltage command value Vec is calculated, thereby ending this processing. The EPS motor voltage command value Vec is feedback-controlled by using PI control. Assuming that a proportional gain and an integral gain in the EPS motor feedback control are KPe and KIe, respectively, the VGRS motor voltage command value Vec is calculated by the following equation (6).

$$Vec = KPe \times Id + KIe \times \int Id \, dt \quad (6)$$

Figure 13:
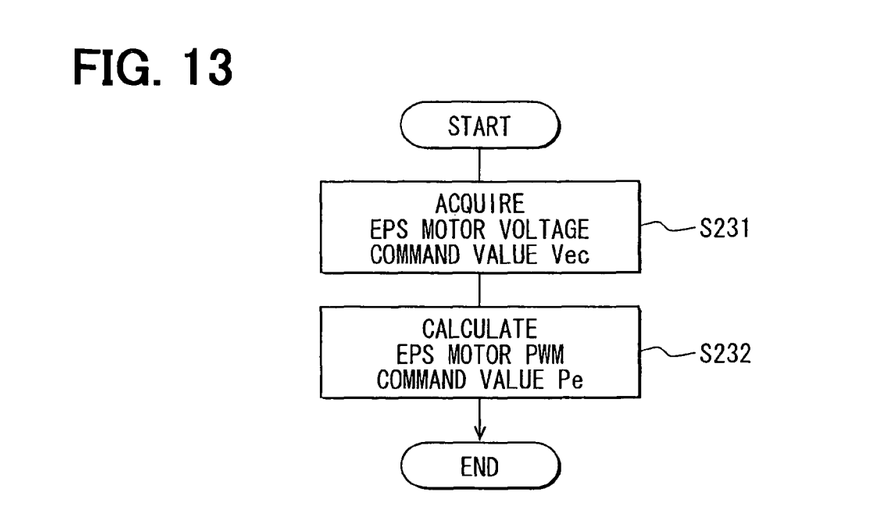
FIG. 13 is a flowchart showing PWM command value calculation processing performed by the EPS device in the first embodiment of the present invention.

The EPS motor PWM command value calculation processing will be described with reference to FIG. 13. At S231, the EPS motor voltage command value Vec calculated at S223 in FIG. 12 is acquired. At S232, an EPS motor PWM command value Pe is calculated. Assuming that the battery voltage is Vb, the EPS motor PWM command value is calculated by the following equation (7).

$$Pe = Vec / Vb \times 100 \quad (7)$$

The EPS control part 86 controls the operation of the EPS motor 82 by controlling timing of on/off of the switching elements of the EPS inverter 87 (S240 in FIG. 10) based on the EPS motor PWM command value Pe calculated by at S232. The steering operation of the steering wheel 8 by the driver is assisted by the torque generated by driving the EPS motor 82.

In case that the steering operation of the steering wheel 8 cannot be assisted by the EPS device 5 due to failure or the like of the EPS device 5, the angular range, by which the steering operation can be attained with the torque applied by the driver, is widened.

The speed increase ratio is described here. The speed increase ratio indicates the ratio between the rotation angle of the input shaft 10 and the rotation angle of the output shaft 20. It is a value determined by dividing the rotation angle of the output shaft 20 by the rotation angle of the input shaft 10. The rotation angle of the output shaft 20 is calculated by multiplying the rotation angle of the input shaft 10 by the speed increase ratio. If the speed increase ratio is 1, the rotation angles of the input shaft 10 and the output shaft 20 equal to each other. If the speed increase ratio is less than 1, the rotation angle of the output shaft 20 is less than that of the input shaft 10. The direction of rotation of the input shaft 10 and the direction of rotation of the output shaft 20 are opposite due to operation of the differential gear. As a result, when the speed increase ratio is 1 and the steering wheel 8 is operated by an angle θh in the clockwise direction, the input shaft 10 is turned by the angle θh in the clockwise direction and the output shaft 20 is turned by the angle θh in the counterclockwise direction when viewed from the steering wheel 8 side.

Figure 15:
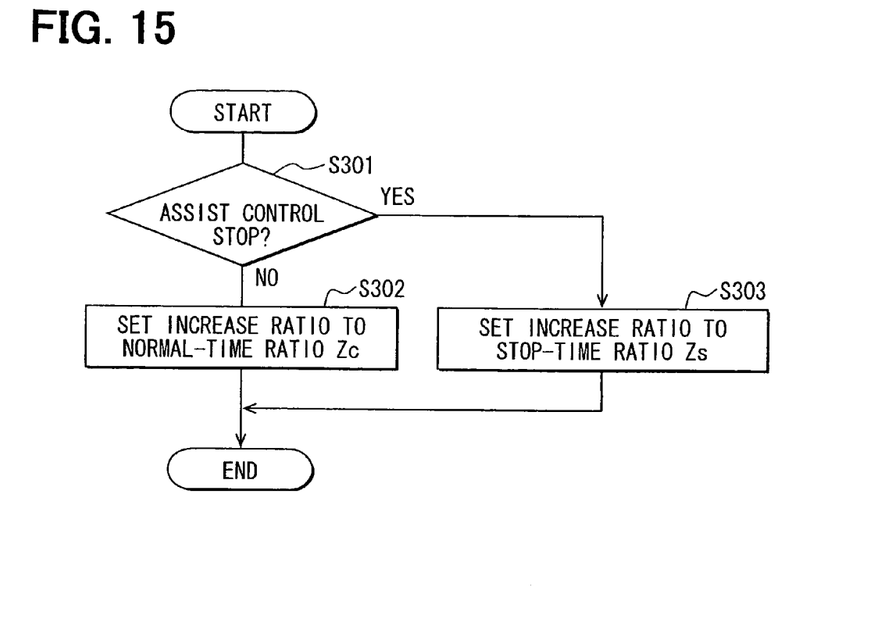
FIG. 15 is a flowchart showing speed increase ratio calculation processing performed by the EPS device in the first embodiment of the present invention.

The speed increase ratio calculation processing by the VGRS control part 56 is described with reference to FIG. 15. The flowchart shown in FIG. 15 is a sub-flowchart of the VGRS motor rotation angle command value calculation processing shown in FIG. 7 and corresponds to the speed increase ratio calculation processing executed at S112 in FIG. 7.

It is checked at S301 whether the assist control of the EPS device 5 for assisting the steering operation of the steering wheel 8 is being stopped due to, for example, failure or the like of the EPS device 5. This checking is determined based on an EPS failure signal, which is outputted from the EPS control part 86 when the EPS device 5 cannot generate the assist torque for assisting the steering operation of the steering wheel 8. The EPS failure signal is acquired by way of a CAN (Controller Area Network). If it is determined that the assist control for assisting the steering operation of the steering wheel 8 by the EPS device 5 is being stopped (S301: YES), S303 is executed. If it is determined that the assist control for assisting the steering operation of the steering wheel 8 by the EPS device 5 is not being stopped (S301: NO), S302 is executed.

Figure 7:
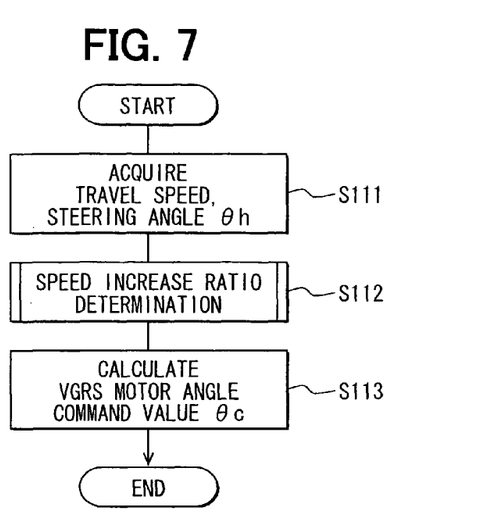
FIG. 7 is a flowchart showing VGRS motor rotation angle command value calculation processing in the first embodiment of the present invention.
Figure 16:
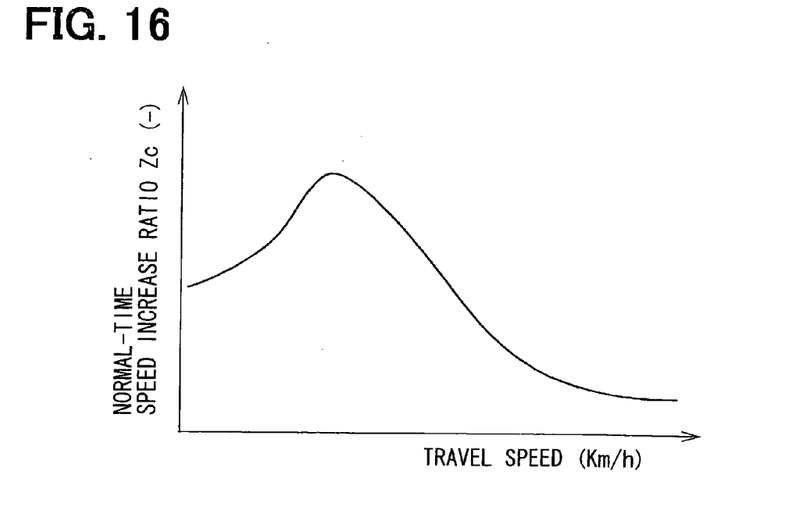
FIG. 16 is a graph showing a relation between a vehicle travel speed and a speed increase ratio in the first embodiment of the present invention.

At S302, the speed increase ratio is determined based on the travel speed acquired at S111 of FIG. 7. The speed increase ratio at this time is set as a normal-time speed increase ratio Zc. The relation between the travel speed and the normal-time speed increase ratio Zc is pre-stored in a data map form. The relation between the travel speed and the normal-time speed increase ratio Zc is pre-stored in the map form shown in FIG. 16. As shown in FIG. 16, the normal-time speed increase ratio Zc increases as the travel speed increases in a low speed range, that is, when the travel speed is less than a predetermined value. The normal-time speed increase ratio Zc decreases as the travel speed increases in a high speed range, that is, when the travel speed is greater than the predetermined value.

Returning to FIG. 15, S303 is executed if it is determined that the assist control by the EPS device 5 for assisting the steering operation of the steering wheel 8 is being stopped (S301: YES). The speed increase ratio Zs is determined so that the rotation angle of the output shaft 20 is less than that of the input shaft 10. The speed increase ratio Zs at this time is set as a stop-time speed increase ratio Zs. As described above, since the rotation angle of the output shaft 20 is calculated by multiplying the rotation angle of the input shaft 10 by the speed increase ratio, the stop-time speed increase ratio Zs is set to a value, for example 0.2, which is less than 1. The VGRS motor 52 is controlled and driven based on the speed increase ratio Zs determined by this processing. Specifically, the processing of FIG. 7 subsequent to S113 is executed by using the determined speed increase ratio Z, which is either the normal-time speed increase ratio Zc or the stop-time speed increase ratio Zs.

Figure 17:
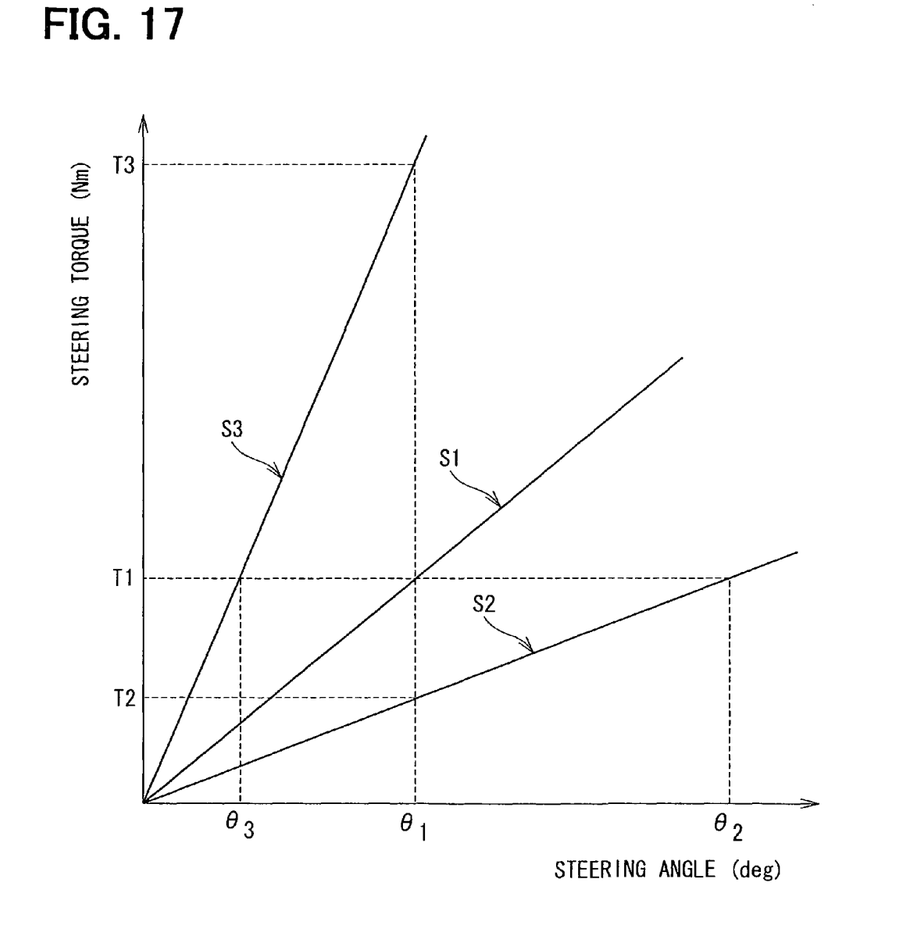
FIG. 17 is a graph showing a relation between a steering angle and a steering torque.

Here, relations between a steering torque T required to steer the steering wheel 8 and the steering angle θ are shown in FIG. 17. It is assumed in any of the relations that the vehicle is traveling at a constant speed, at which the speed increase ratio becomes greater than 1 when the assist control of the EPS device 5 for assisting the steering of the steering wheel 8 is being performed. In FIG. 17, a solid line characteristic S1 indicates one relation between the steering torque and the steering angle when the assist control of the EPS device 5 for assisting the steering wheel 8 is being performed. A solid line characteristic S2 indicates another relation between the steering torque and the steering angle with the speed increase ratio being set to the stop-time speed increase ratio Zs when the assist control of the EPS device 5 for assisting the steering operation of the steering wheel 8 is being stopped. A solid line characteristic S3 indicates, as a reference example, the other relation between the steering torque and the steering angle with the speed increase ratio being set to the normal-time speed increase ratio Zc when the assist control of the EPS device 5 for assisting the steering operation of the steering wheel 8 is being stopped. It is assumed that the steering torque required to operate the steering wheel 8 increases as the angle of steering the steered wheels 7 increases. That is, if the speed increase ratio Z is constant, the steered wheels 7 are steered more as the steering angle of the steering wheel 8 increases and hence the steering torque increases. When the steering wheel 8 is rotated to the angle θ, the torque T required to steer the steering wheel 8 decreases because the steered angle of the steered wheels 7 decreases with a decrease in the speed increase ratio Z.

If the assist control of the EPS device 5 is being performed for assisting the steering operation of the steering wheel 8 (S301: NO), the speed increase ratio Z is set to the normal-time speed increase ratio Zc, which is greater than 1, based on the travel speed (S302), so that the VGRS motor 52 is controlled and driven by using the normal-time speed increase ratio Zc. It is assumed at this time that the steering torque T required to rotate the steering wheel 8 by an angle θ1 is T1 as shown by the solid line characteristic S1.

If the assist control of the EPS device 5 for assisting the steering operation of the steering wheel 8 is stopped, the following control is performed. In the reference example, when the assist control of the EPS device 5 for assisting the steering operation of the steering wheel 8 is stopped and the speed increase ratio Z is set to the normal-time speed increase ratio Zc, which is greater than 1, based on the travel speed, torque T3 is required to operate the steering wheel 8 to the angle θ1 as shown by the solid line characteristic S3. The torque T3 is greater than the torque T1, which is required when the assist control of the EPS device 5 is performed for assisting the steering operation of the steering wheel 8. That is, since greater torque is required to operate the steering wheel 8 than in the case, in which the assist control of the EPS device 5 is performed for assisting the steering operation of the steering wheel 8, the user is likely to erroneously feel that the steering wheel 8 is locked.

Therefore, if the assist control of the EPS device 5 for assisting the steering operation of the steering wheel 8 is being stopped due to, for example, failure or the like in the EPS device 5 (S301: YES), the speed increase ratio Z is set to the stop-time speed increase ratio Zs, which is less than the speed increase ratio 1, so that the rotation angle of the output shaft 20 becomes less than that of the input shaft 10 (S303). Since the stop-time speed increase ratio Zs is set to a sufficiently small value, the steering wheel 8 can be operated to the angle θ1 with small torque T2 as indicated by the solid line characteristic S2. The torque T2 is less than the torque T1 required when the assist control of the EPS device 5 is being performed for assisting the steering operation of the steering wheel 8.

When the steering wheel 8 is operated with the torque T1, the steering wheel 8 can be operated to the rotation angle θ2 under the condition that the assist control of the EPS device 5 for assisting the steering operation of the steering wheel 8 is stopped and the stop-time speed increase ratio Zs is used as the speed increase ratio. With the same torque T1, the steering wheel 8 can be operated to the rotation angle θ1 under the condition that the assist control of the EPS device 5 for assisting the steering operation of the steering wheel 8 is performed and the normal-time speed increase ratio Zc is used as the speed increase ratio. The rotation angle θ2 is greater than the rotation angle θ1. Further, when the steering wheel 8 is operated with the torque T1, the steering wheel 8 can be operated to the rotation angle θ2 under the condition that the assist control of the EPS device 5 for assisting the steering operation of the steering wheel 8 is stopped and the stop-time speed increase ratio Zs is used as the speed increase ratio. With the same torque T1, the steering wheel 8 can be operated to the rotation angle θ3 under the condition that the assist control of the EPS device 5 for assisting the steering operation of the steering wheel 8 is stopped and the normal-time speed increase ratio Zc is used as the speed increase ratio. The rotation angle θ2 is greater than the rotation angle θ3. That is, the steering wheel 8 can be operated over a wider angular rang by setting the speed increase ratio to the stop-time speed increase ratio Zs, which is less than 1, when the assist control of the EPS device 5 for assisting the steering operation of the steering wheel 8 is being stopped.

The angle of the steered wheels 7, which is steered when the steering wheel 8 is operated by the angle θ1 by using the stop-time speed increase ratio Zs smaller than the normal-time speed increase ratio Zc, is less than the angle of the steered wheels 7, which is steered when the steering wheel 8 is operated by the same angle θ1 by using the normal-time speed increase ratio.

The steering control apparatus 1 according to the first embodiment provides the following advantages.

(1) The input shaft 10 is coupled to the steering wheel 8, which is operated by a driver. The output shaft 20 is provided relatively rotatably to the input shaft 10 and forms a torque transfer path to transfer torque applied to the steering wheel 8 to the steered wheels 7 side. The VGRS device 3 includes the gear mechanism 30, which transfers rotation of the input shaft 10 to the output shaft 20, and the VGRS motor 52, which drives the gear mechanism 30. The VGRS device 3 is configured to vary the ratio between the rotation angle of the input shaft 10 and the rotation angle of the output shaft 20. The EPS device 5 includes the EPS motor 82 and is configured to assist the steering operation of the steering wheel 8 by the driver by torque generated by the EPS motor 82.

The speed increase ratio Z, which is the ratio between the rotation angle of the input shaft 10 and the rotation angle of the output shaft 20, is determined (S112) in FIG. 7. Driving of the VGRS motor 52 is controlled based on the determined speed increase ratio (S140 in FIG. 6). It is checked whether the steering assist operation of the power steering device 8 by the EPS device 5 is being stopped (S301 in FIG. 15). The speed increase ratio Z is determined to the stop-time speed increase ratio Zs, which is less than 1 so that the rotation angle of the output shaft 20 is reduced to be less than the rotation angle of the input shaft 10 (S303), when it is determined that the assist control of the EPS device 5 for assisting the steering operation of the steering wheel 8 is being stopped (S301: YES).

As the rotation angle of the output shaft 20 increases, the steered angle of the steered wheels 7 increases. As the steered angle of the steered wheels 7 increases, the torque required to operate the steering wheel 8 increases. If the assist control of the EPS device 5 for assisting the steering operation of the steering wheel 8 is stopped due to the failure of the EPS device 5, for example, more torque is required to operate the steering wheel 8 than in the normal steering operation and hence it is likely to be erroneously felt that the steering wheel 8 is locked. Due to recent improvement in the motor output, the EPS device is used even in medium-sized vehicles and large-sized vehicles. If the EPS device stops steering assist operation in the heavy vehicles such as the medium-sized vehicles or the large-sized vehicles, the steering wheel 8 will almost not be moved. If the assist control of the EPS device 5 for assisting the steering operation of the steering wheel 8 (S301: YES), the steered angle of the steered wheels 7 is decreased by decreasing the rotation angle of the output shaft 20 relative to the rotation angle of the input shaft 10 coupled to the steering wheel 8. Thus, the angular range, by which the steering wheel can be operated, is widened. Thus, by changing the speed increase ratio Z related to drive control for the VGRS motor 52 of the VGRS device 3 when the assist control of the EPS device 5 for assisting the steering operation of the steering wheel 8, the steered wheels 7 can be controlled appropriately. By further decreasing the rotation angle of the output shaft 20 relative to the rotation angle of the input shaft 10, the steering wheel 8 can be operated over an increased angular range with relatively small torque. As a result, it is less likely that the driver will erroneously feel that the steering wheel 8 is locked.

(2) The torque transfer path includes the column shaft 2, which has the input shaft 10 and the output shaft 20, and the rack-and-pinion mechanism 6, which converts the rotary motion of the column shaft 2 to the linear motion. The VGRS device 3 and the EPS device 5 are provided on the column shaft 2. The VGRS device 3 and the EPS device 5 are integrated as a single module. Thus, the steering control apparatus 1 can be mounted even on the small-sized vehicles, in which mounting space is limited and the VGRS device 3 cannot be mounted easily.

The VGRS control part 56 forms a speed increase ratio calculation part, a drive control part, a stop check part and a travel speed acquisition part.

S302 and S303 in FIG. 15 correspond to processing as a function of the speed increase ratio calculation part. S301 corresponds to processing as a function of the stop check part. S104 in FIG. 6 corresponds to processing as a function of the drive control part. S111 in FIG. 7 corresponds to processing as a function of the travel speed acquisition part.

Second Embodiment

Figure 18:
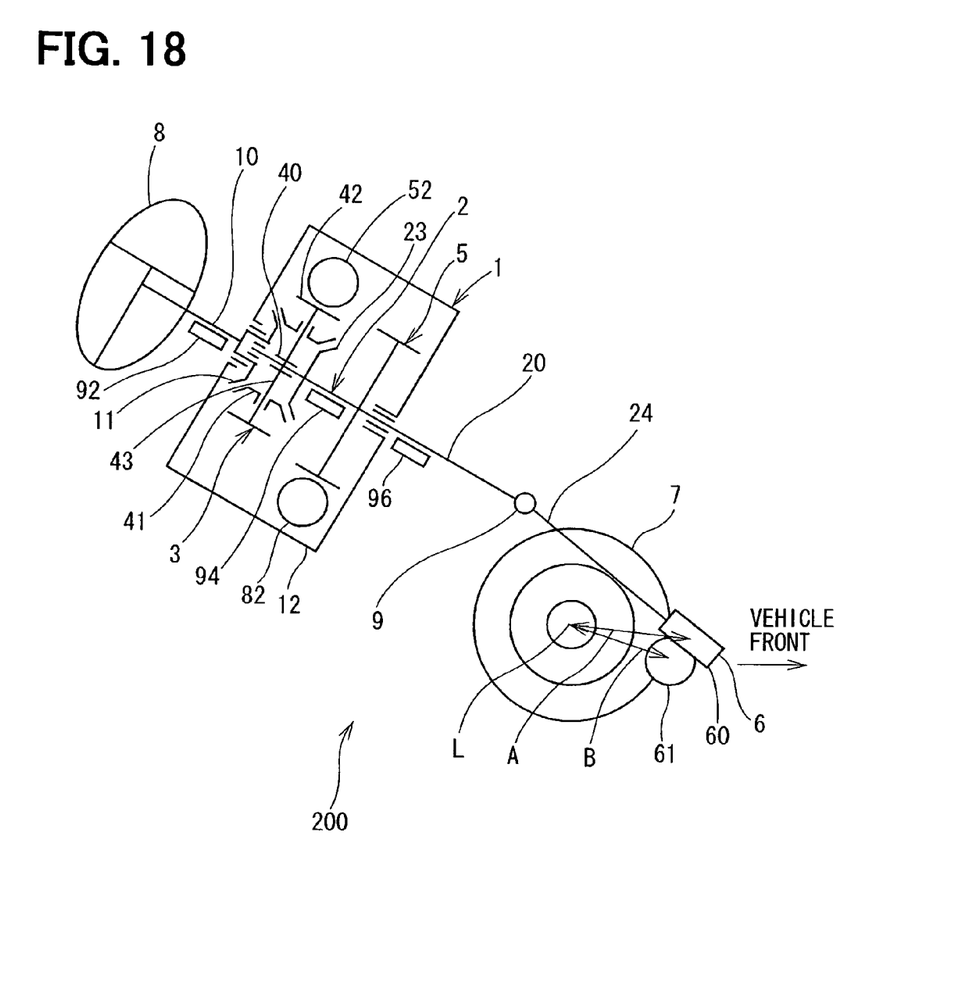
FIG. 18 is a schematic view showing a steering control apparatus according to a second embodiment of the present invention.

In the steering control apparatus 1 according to the first embodiment, the rack-and-pinion mechanism 6 is provided at the more rear side of the vehicle relative to the straight line, which connects the rotation centers of the left and right vehicle wheels 7. This steering control apparatus 1 may be constructed as shown in FIG. 18 as a second. Substantially the same structure as in the foregoing embodiments is indicated by the same reference numerals and description is omitted. As shown by a steering system 200 shown in FIG. 18, the rack-and-pinion mechanism 6 may be provided at a more rear side of the vehicle relative to the straight line L connecting the centers of rotation of the left and right vehicle wheels 7. In the example shown in FIG. 18, the distance A between the steering pinion 60 and the straight line L connecting the centers of rotation of the left and right vehicle wheels 7 is shorter than the distance B between the steering rack bar 61 and the straight line L connecting the centers of rotation of the left and right vehicle wheels.

Also in the second embodiment shown in FIG. 18, the output shaft 20 rotates in the direction opposite to the direction of rotation of the input shaft 10 due to the differential gear provided between the input shaft 10 and the output shaft 20. When the steering wheel 8 is operated in the counter-clockwise direction, the steering pinion 60 rotates in the clockwise direction when viewed from the universal joint 9 and the steering rack bar 61 moves in the left direction. Thus, the steered angles of the vehicle wheels 7 are changed so that the vehicle is steered in the left direction. When the steering wheel 8 is operated in the clockwise direction, the steering pinion 60 rotates in the counter-clockwise direction when viewed from the universal joint 9 and the steering rack bar 61 moves in the right direction. Thus, the steered angles of the vehicle wheels 7 are changed so that the vehicle is steered in the right direction.

By thus setting the distance A between the steering pinion 60 and the straight line L connecting the centers of rotation of the left and right vehicle wheels 7 in the similar manner as the first embodiment to be longer than the distance B between the steering rack bar 61 and the straight line L connecting the centers of rotation of the left and right vehicle wheels 7, that is, A>B, the vehicle wheels 7 are steered in the direction opposite to the direction of rotations of the output shaft 20, the shaft 24 and the steering pinion 60 so that the rotation direction of the steering wheel 8 and the steered direction of the vehicle wheels 7 are matched.

Other Embodiment

According to the foregoing embodiments, when the assist control of the EPS device 3 for assisting the steering operation of the steering wheel 8 is being stopped, the speed increase ratio Z is set to the value Zs, which is less than 1, so that the rotation angle of the output shaft 20 becomes less than the rotation angle of the input shaft 10. The torque required to operate the steering wheel 8 increases as the travel speed decreases. For this reason, when the assist control of the EPS device 3 for assisting the steering operation of the steering wheel 8 is being stopped, the speed increase ratio Z may be set to a value, which is variable with the travel speed within a range that the rotation angle of the output shaft 20 becomes less than the rotation angle of the input shaft 10. That is, when it is determined that the steering assist operation of the power steering device is being stopped, the speed increase ratio Z may be determined so that the rotation angle of the output shaft 20 relative to the rotation angle of the input shaft 10 becomes smaller as the travel speed becomes lower.

Thus, by changing the speed increase ratio Z related to control of the VGRS motor 52 of the VGRS device 3 so that the rotation angle of the output shaft 20 decreases as the travel speed decreases, the steering operation of the steering wheel 8 can be controlled appropriately. Further, even under a low speed travel condition, in which large torque is required to operate the steering wheel 8, it is less likely that the driver will erroneously feel that the steering wheel 8 is locked.

The speed increase ratio Z at the time of stopping the assist operation of the EPS device 5 may be the predetermined value as in the foregoing embodiments, the variable value determined as a function of the travel speed or a variable value determined to change in steps based on the travel speed. At high speed travel time, in which the speed increase ratio is set to a relatively small value under a condition that the assist control of the EPS device 5 is performed, the speed increase ratio Z is set to a similar ratio as in the case of performing the assist control even if the assist control of the EPS device 5 is not performed. The steering angles θ1, θ2 and θ3 may be set to satisfy the relation, θ3<θ1<θ2, assuming that the steering wheel 8 is operated with the same torque T1 as shown in FIG. 17. θ1 indicates the steering angle of the steering wheel 8, when the speed increase ratio Z is set to the normal-time speed increase ratio Zc under the condition that the EPS device 5 is performing the steering assist control. θ2 indicates the steering angle of the steering wheel 8, when the speed increase ratio Z is set to the stop-time speed increase ratio Zs, which is less than 1, under the condition that the EPS device 5 is stopping the steering assist control. θ3 indicates the steering angle of the steering wheel 8, when the speed increase ratio Z is set to the normal-time speed increase ratio Zc under the condition that the EPS device 5 is performing the steering assist control.

The relation may be θ3<θ2<θ1.

That is, when the EPS device is stopping the steering assist control (S301: YES in FIG. 15), the stop-time speed increase ratio Zs is set to a value smaller than the normal-time speed increase ratio Zc. As a result, the steered angle of the steered wheels 7 is reduced and hence the steering wheel 8 can be operated over a wider angular range with the same torque (that is, θ3<θ2). Thus it is less likely that the driver will erroneously feel that the steering wheel 8 is locked.

According to the foregoing embodiments, the VGRS device 3 and the EPS device 5 are integrated in the single module and provided in the column shaft 2. However, the VGRS device 3 and the EPS device 5 need not be integrated. The VGRS device 3 and the EPS device 5 may be provided at separate positions, for example, in the column shaft 2 and the rack shaft 61, respectively.

According to the foregoing embodiments, the VGRS-ECU 55 and the EPS-ECU 85 are provided separately. However, one ECU may be configured to control both the VGRS device 3 and the EPS device 5. The VGRS device 3 is controlled by calculating the VGRS motor voltage command value based on the rotation angle of the VGRS motor 52. However, the VGRS device 3 may be controlled based on the pinion angle detected by a pinion angle sensor in place of the rotation angle of the VGRS motor 52.

The present invention is not limited to the above-described embodiments but may be implemented in other different embodiments.

What is claimed is:

1. A steering control apparatus comprising:
   an input shaft coupled to a steering device operated by a driver;
   an output shaft provided rotatably to the input shaft and forming a torque transfer path to transfer torque applied to the steering member to steered wheels side;
   a variable gear ratio steering device including a gear mechanism, which transfers rotation of the input shaft to the output shaft, and a first motor, which drives the gear mechanism, the variable gear ratio steering device being configured to vary a ratio between a rotation angle of the input shaft and a rotation angle of the output shaft;
   a power steering device including a second motor and configured to assist steering operation of the steering device by the driver by torque generated by the second motor;
   a speed increase ratio calculation part for determining a ratio between the rotation angle of the input shaft and the rotation angle of the output shaft;
   a drive control part for controlling operation of the first motor based on the speed increase ration determined by the speed increase ratio calculation part; and
   a stop check part for checking whether steering assist operation of the power steering device is being stopped, wherein
   the speed increase ratio calculation part determines the speed increase ratio so that the rotation angle of the output shaft is reduced to be less than the rotation angle of the input shaft, when the stop check part determines that the steering assist operation of the power steering device is being stopped;
   the torque transfer path includes a column shaft, which has the input shaft and the output shaft, and a rack-and-pinion mechanism for converting rotary motion of the column shaft to linear motion;
   the variable gear ratio steering device and the power steering device are provided on the column shaft;
   the variable gear ratio steering device and the power steering device are integrated into a single module; and
   the gear mechanism of the variable gear ratio steering device is a differential gear formed of an input gear, an output gear and a pinion gear.

2. The steering control apparatus according to claim 1, further comprising:
   a travel speed acquisition part for acquiring travel speed of a vehicle,
   wherein the speed increase ratio calculation part determines the speed increase ratio so that the rotation angle of the output shaft is reduced relative to the rotation angle of the input shaft as the travel speed is smaller, when the stop check part determines that the steering assist operation of the power steering device is being stopped.

* * * * *